July 26, 1932.　　　W. H. ROBBINS　　　1,868,808
FILTER
Filed Feb. 7, 1927　　　3 Sheets-Sheet 1

INVENTOR
WILLIAM H. ROBBINS,

July 26, 1932.  W. H. ROBBINS  1,868,808
FILTER
Filed Feb. 7, 1927    3 Sheets-Sheet 2

Inventor
WILLIAM H. ROBBINS,
BY Toulmin Toulmin
Attorneys

July 26, 1932.  W. H. ROBBINS  1,868,808

FILTER

Filed Feb. 7, 1927  3 Sheets-Sheet 3

INVENTOR
WILLIAM H. ROBBINS,
BY
ATTORNEYS

Patented July 26, 1932

1,868,808

UNITED STATES PATENT OFFICE

WILLIAM H. ROBBINS, OF SPRINGFIELD, OHIO, ASSIGNOR TO THE WILLIAMS COMPANY, OF LONDON, OHIO, A CORPORATION OF OHIO

FILTER

Application filed February 7, 1927. Serial No. 166,474.

My invention relates to filters and in particular to steel shaving filters.

It is the object of my invention to provide either a stationary or rotating filter which will be self cleaning, which will present liquids in the path of the gases, and the like, to be filtered and which will deposit in the liquid the material collected from the gas that is passed therethrough to be cleaned.

It is my object to provide novel forms of arranging and supporting steel shavings for filtering purposes.

Heretofore it has been customary to form a pad or blanket of steel wool for this purpose but it has been impossible to maintain it in such a homogeneous fashion that there will be a uniform resistance to passage of gases and material therethrough. It has been impossible to arrange the wool evenly and it has been impossible to arrange it in a thin layer or to automatically remove the materials collected on the wool. To clean the wool it has been necessary to go to laborious hand operations of cleaning which make it cheaper to throw the wool away than to clean it. The cost of such cleaning and repairs is undesirable and it is my object to obviate these difficulties.

Referring to the drawings.

Figure 1:
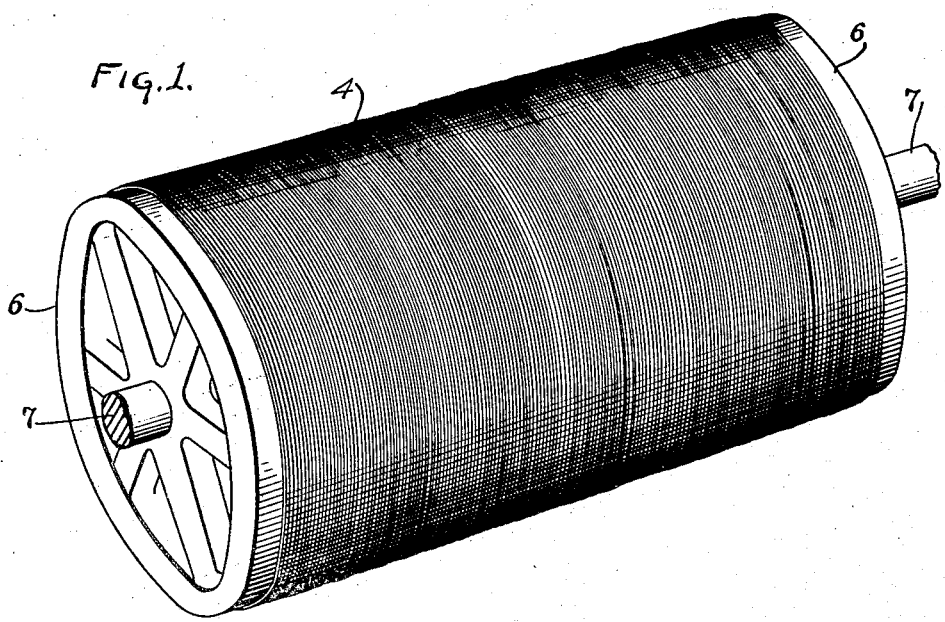
Fig. 1 shows a drum of steel shavings the strands being wrapped around the drum continuously, side by side, forming one or more layers. These strands have been exaggerated in the drawings as they are extremely fine, but the drawings will be sufficient to give an adequate illustration of how the strands are arranged.

Referring to the drawings in detail, 1 is a case having an inlet passageway 2 and outlet passageway 3 for the gases carrying the material which is filtered by one or more layers of steel shavings 4 wound on the frame or drum. The drum is composed of a series of spaced bars 5 mounted on end spiders 6 which are in turn mounted upon the shaft 7 that is rotated by a pulley such as the pulley 8 driven by a belt 9. The steel shavings is wound with a continuous strand so that the strands are side by side. There may be more than one layer of these carefully wound strands but the number of layers depends upon the filtering problem.

This drum-like reel or the frame dip into the liquid 10, such as oil or water, which facilitates either cleaning the steel shavings or picking up the material from the air which is being filtered or both. 11 indicates some of the material which has been filtered out of the incoming gases.

Figure 2:
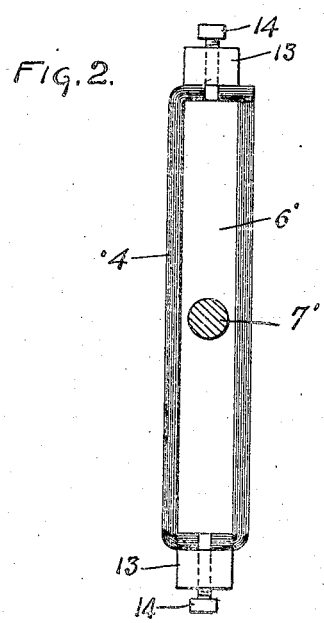
Fig. 2 is a view of a flat frame which is a modification of the form of steel wool carrying-frame, shown in Figure 1.
Figure 3:
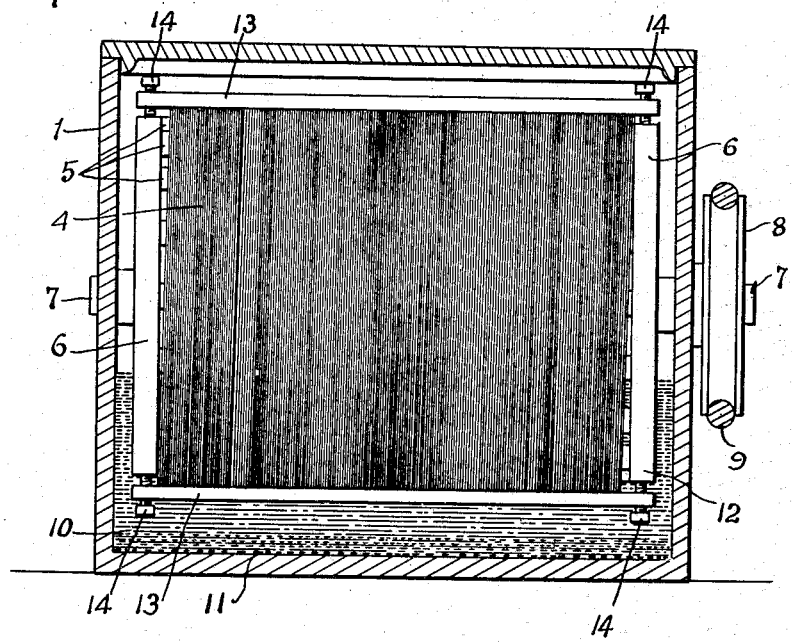
Fig. 3 is a section through a filtering chamber showing the face of the drum of wool. The spaces on the sides and above the top of the drum are not large enough in actual practice to allow any appreciable amount of air to pass around and above the drum.

In the case of the frame it is composed of a rectangular body designated 12 on the top and bottom of which are mounted clamps 13 consisting of strips clamped down upon the wool to hold it in position. The clamps are held in position by the bolts or screws 14. Figure 2 shows a modified form of frame structure, on which the steel wool is wound for the purpose of forming a filter in a form different from that shown in Figure 1.

Figure 4:
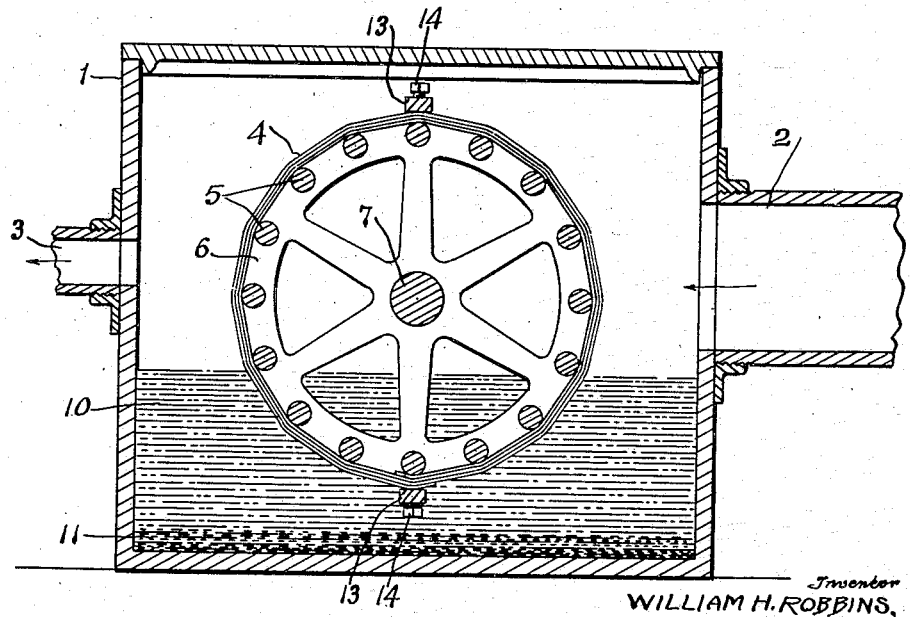
Fig. 4 is a section through the filtering chamber showing the use of the drum type.

The frame in this case is rectangular in shape, having end pieces 6' and bars corresponding to the space bars 5 shown in connection with the drum, more particularly shown in Figure 4. This form of the frame has the same clamp member 13, with the accompanying clamping screw, as is shown in connection with the drum form. This form of the device has the shaft 7', similar to that shown in connection with the drum.

In all respects the operation of this form of steel wool-carrying means is similar to that of the drum, fitting into the same form of carrying means and working in the same form of box or case.

In some installations it is found desirable not to rotate the screens continuously but to change their position intermittently in order to present new surfaces for filtration purposes while the surface which has collected material is immersed in the liquid 10 giving the steel shavings time to discharge its collection of filtered material into the liquid.

Figure 5:
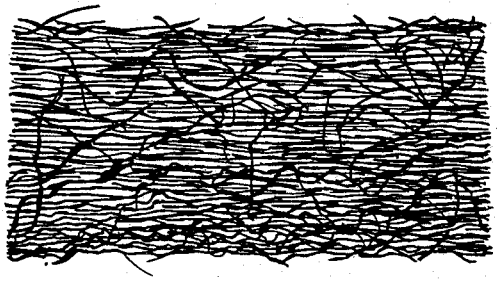
Fig. 5 is a plan view of a quantity of the steel wool as it comes from the steel wool producing machine.
Figure 6:
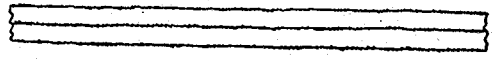
Fig. 6 is a much enlarged side view of one of the steel strands.
Figure 7:
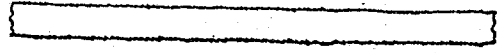
Fig. 7 is a like view looking at another side of the strand.
Figure 8:
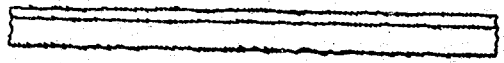
Fig. 8 is still another side view looking at yet another side of the strand.
Figure 9:
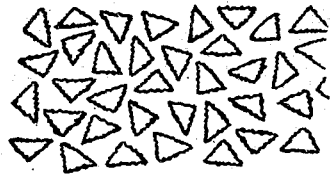
Fig. 9 is a much enlarged view looking at the ends of a mass of strands of one form they sometimes have.
Figure 10:
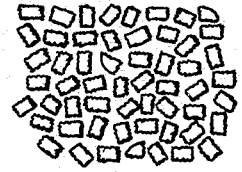
Fig. 10 is a like view showing another form the strands sometimes have.

From Figures 5 to and including Figure 10, the nature, character and form of the strands of the wool shavings will be seen. In these figures the strands have been enlarged so that their form and character may be seen. Note that they have edges running longitudinally and forming corners which are substantially sharp and have faces which are more or less roughened as a result of the manner in which they are preferably produced from long wires fed into the cutting machine. Note also that these strands are so positioned in the completed filter that these sharp edges, which are more or less rough or fuzzy, run generally crosswise to the line of movement of the air or gases under filtration. For this reason the floating particles in the air or gases are readily and constantly caught or arrested by these edges or corners. This construction and resulting mode of operation bring about a sure and active means of arresting the floating particles while allowing the air or gases to pass off through the filter.

The strands which are wound on the holder or drumlike structure are of this peculiar nature and formation; and as many layers of such strands may be applied to the drum as desired for the particular kind of filtration to be performed.

It will be understood that I desire to comprehend within my invention such modification as may be necessary to adapt it to varying conditions and uses.

By "steel shavings" I comprehend within my invention what is known in the trade as "steel wool." Steel wool, as known in the art, is composed of very fine, irregularly-shaped, continuous strands cut from steel wires by cutting tools in the usual manner. While they are steel shavings, they are of such fine diameter that they are known in the trade and in the art as steel wool.

Having thus fully described my invention, what I claim as new and desire to secure by Letters Patent, is:—

1. In combination a casing having inlet and exit openings for gases to be filtered, said casing being arranged to contain liquid therein, a frame consisting of a plurality of spaced members to form a drum through which the gases can pass and a steel strand wound on said drum with the loops of the strands side by side, said drum being arranged to substantially fill the casing.

2. In combination a frame, steel strands wound thereon in regular order in a layer, and means consisting of strips exteriorly mounted on the sides of said frame and means for causing said strips to clamp the loops of the strand so wound in predetermined order against the exterior of said frame.

3. In a filter, a casing adapted to contain a liquid and having an inlet and outlet for the passage of gases, and a revolving filter drum in said casing, said drum consising of a shaft having at each end a spider member having a peripheral rim, spaced bars connecting said rims and strands of steel wool shavings wrapped around the bars.

4. In a filter, a shaft, a pair of spaced spider members on said shaft, each spider member having a peripheral rim, spaced bars in said rims and connecting the spider members, and strands of steel wool wound around the bars.

5. In combination, a casing through which gases are passed for the filtering of material therethrough, a frame therein and a strand of steel shaving which has been cut from wire, and means for rotating said frame, said frame having end members and having a plurality of spaced parallel cross bars extending between the end members and attached thereto upon which the steel shaving is wound in uncompressed condition to form layers thereon.

In testimony whereof, I affix my signature.

WILLIAM H. ROBBINS.